Feb. 2, 1960 G. L. RICHARDS 2,923,776

RINGING CODE DETECTOR

Filed Dec. 14, 1956 3 Sheets-Sheet 1

INVENTOR
GLENN L. RICHARDS
BY
Francis E. Blake
ATTORNEY

Feb. 2, 1960 G. L. RICHARDS 2,923,776

RINGING CODE DETECTOR

Filed Dec. 14, 1956 3 Sheets-Sheet 2

INVENTOR
GLENN L. RICHARDS
BY Francis E Blake
ATTORNEY

Feb. 2, 1960 G. L. RICHARDS 2,923,776

RINGING CODE DETECTOR

Filed Dec. 14, 1956 3 Sheets-Sheet 3

INVENTOR
GLENN L. RICHARDS
BY Francis E. Blake
ATTORNEY

United States Patent Office 2,923,776

Patented Feb. 2, 1960

2,923,776

RINGING CODE DETECTOR

Glenn L. Richards, Ames, Iowa, assignor to General Dynamics Corporation, Rochester, N.Y., a corporation of Delaware Application December 14, 1956, Serial No. 628,394

2 Claims. (Cl. 179—17)

This invention relates to telecommunication systems and particularly to code ringing arrangements for party line telephone systems.

The object of the invention is to provide substation means which will respond to code ringing potentials applied to a substation line and render effective only the particular code to which the particular substation is arranged to respond.

As a specific example of code ringing arrangements, attention is directed to the copending application of George Elliott, Serial Number 432,755, filed May 27, 1954. Here is provided a means whereby a plurality of substations are connected to a line and arrangements are made to call these stations by one ring and two ring codes. It therefore appears that the substations will be grouped in pairs and both substations of each pair will respond to the same ringing current, it being left to the subscribers to mentally differentiate between the one ring and two ring codes. It is desirable, however, to sound the substation bell only when the party thereat is wanted. The object of the present invention is to provide a circuit means at each substation which will pass only that code to which the particular substation is intended to respond.

The invention resides in a pair of electronic circuits, a first of which will respond to a two ring code and will exclude a one ring code and a second of which will admit a one ring code and will exclude a two ring code. This arrangement is possible due to the fact that standard and conventional arrangements are such that the two rings of a two ring code are each much shorter than the one ring of a one ring code. It will be noted, in the Elliott arrangement, that the total ringing time of each code is the same, it being continuous in the case of the one long ring code and being divided and spaced apart in two equal intervals in the case of the two short ring code.

In accordance with the means provided to pass a long ring but exclude a two ring code, an electronic circuit having a timing means for reaching a given stage of operation in a period just over the length of one ring of a two ring code is provided and controlled by a fast acting relaxation circuit whereby the operation of this timing means will have to be started from the beginning at the beginning of the second ring of the two ring code with the result that a two ring code cannot pass into the ringing circuit. However, if a one long ring is received, the said timing circuit will operate and will pass the ringing current into the ringing circuit for the last half of the code. The particular station, arranged to respond to the one long ring code will therefore be rung although the actual length of the ring will not be as long as that provided by the ringing arrangements.

In accordance with the means provided to pass a two ring code but to exclude a one long ring code, means is provided to immediately respond to the beginning of a ring either a short ring of a two ring code or a long ring of a one ring code and to establish an excluding condition to exclude the ringing current from the bell circuit as long as this ring is maintained, thus preventing an[y] ringer response to a long ring code and to the first rin[g] of a two ring code. The circuit is, however, provide[d] with a slow acting relaxation circuit which will practical[ly] maintain an established condition which will allow th[e] ringing current to enter the ringing circuit at the begin[ning] of the second ring of the two ring code. Therefor[e] only the second ring of the two ring code will operat[e] the station ringer and the effect there will be exactly th[e] same as at those stations where the one ring code is effec[tive], that is, a standard ringing pattern is provided s[o] that each station will be rung in a standard manner a[s] though it were on a single party line.

The slow relaxation circuit embodied in this circu[it] to pass the two ring code consists of a gas trigger tub[e] having a starting anode connected in a circuit which wi[ll] initially respond to excitation by presenting a potenti[al] above that required to fire the tube but where the po[tential] of this starting anode will shortly fall below suc[h] point and where this lowered potential will be maintaine[d] for a substantial period even after the excitation has bee[n] removed so that when excited by a second ring, the tu[be] which is quenched between rings cannot be triggered [a] second time. This immediately operated tube is em[ployed] to place a load on a voltage divider circuit lea[d]ing to the starting anode of the main ringing curre[nt] passing tube so that this last tube is prevented from o[p]erating during the first ring of a two ring code or duri[ng] the whole of a one long ring code. However, when t[he] first ring of a two ring code comes to an end, this lo[ad] will be relaxed as the first of these tubes ceases to co[n]duct. The potential of the starting anode of this fi[rst] tube, however, is maintained at a value below the criti[cal] value of this tube so that when ringing current is ag[ain] transmitted into the circuit this first tube is prevent[ed] from firing and since it can no longer impose a load [on] the said voltage divider circuit, the potential of the st[art]ing anode of the second tube will rise above its criti[cal] value and this last tube will thereupon conduct ring[ing] current to the substation ringer.

A feature of the invention is the use of two types [of] substation pad circuits, one for use at a substation [ar]ranged to be signalled by a single long ring code and [the] other to be signalled by a two short ring code which [will] only respond to such codes and will translate such co[des] to a uniform single ring code. Each pad will resp[ond] to a particular code and each will exclude all other co[des] but will produce a standard output, the same at all [sta]tions. While the one ring signal thus produced is about the same length as one ring of a two ring cod[e] is still adequate for substation signaling and it has [by] virtue of being the same at all stations and being ef[fec]tive at only that station intended to respond to a pa[rtic]ular code. Thus each subscriber will only be ca[lled] when actually wanted.

Another feature of the invention is a circuit m[eans] requiring a double application of current thereto for [ren]dering means, to pass such current to a use circuit, e[ffec]tive, in which a first application of current is empl[oyed] to block said means and to establish a condition w[hich] will persist over a period constituting a silent period [of a] code and which established condition will, on a se[cond] application of current, render said blocking mean[s] effective.

Another feature of the invention is the use of a tr[igger] tube for loading the circuit of a relay means to pr[event] the operation thereof and the use of a trigger pote[ntial] circuit for said trigger tube having a time constant [so] that its initial high potential surge is reduced to a [value] below a critical value and maintained at such depr[essed] value over a period of no excitation for a predeterm[ined] length of time. This trigger tube has a starting a[node]

ircuit which will respond to an initial energization to roduce a potential above a critical value but which will uickly fall below such critical value and then block any ttempt to raise it above such critical value for a predetermined time whereby such trigger tube rendered nononducting cannot be triggered into operation again with- 1 such predetermined time.

Another feature of the invention is an electronic cir- uit acting within its first two steps as a scale of two evice whereby it requires a succession of at least two nergizing intervals to reach a desired state. By such reans a circuit may be constructed and arranged to re- pond to a two ring code on a telephone line and to eject any one ring code.

Other features will appear hereinafter.

The drawings consist of three sheets having six fig- res, as follows.

Figure 5:
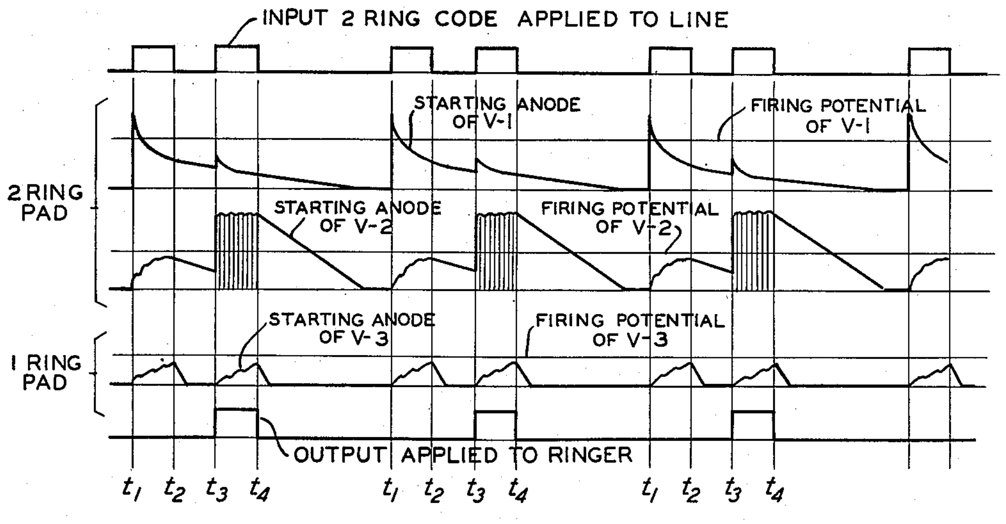
Figure 6:
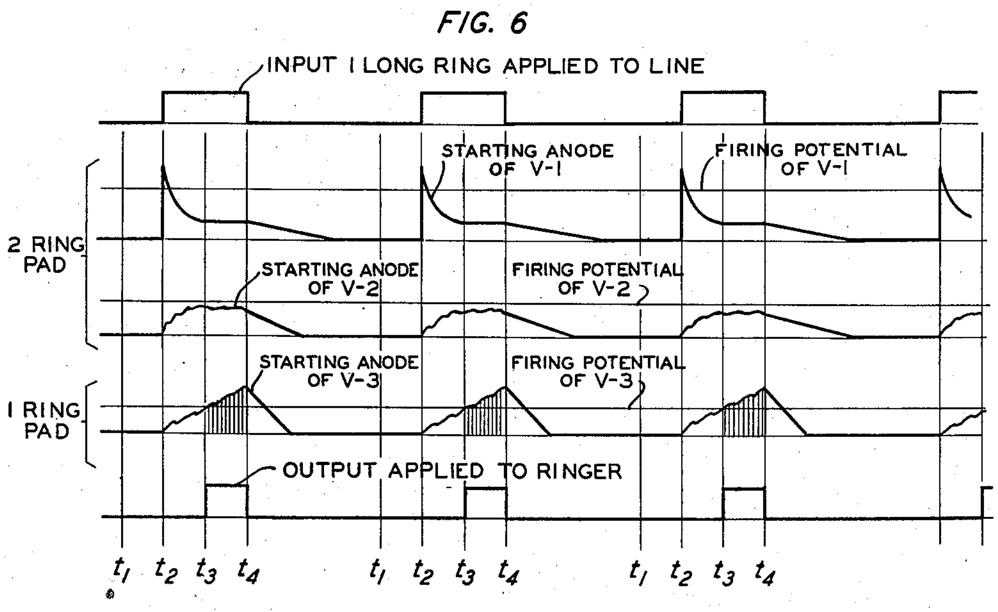

Fig. 5 is a set of graphs plotted against time to show two ring code input, the response of the two ring 1, the response of the one ring pad and the output ging signals at the substation provided with the two g pad; and Fig. 6 is a similar set of graphs plotted against time to w the one long ring code input, the response of the ring pad, the response of the one long ring pad l the output ringing signals at the substation provided h the one long ring pad.

Figure 1:
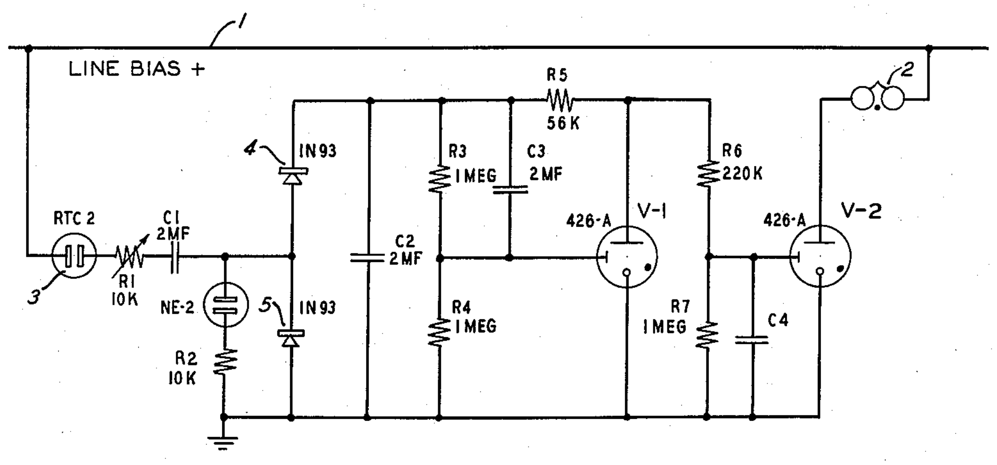
Fig. 1 is a schematic circuit diagram of a two ring ad for excluding all one ring codes and for passing a nging signal triggered by a two ring code to the sub- ation where it is located, the pad being shown con- ected to one of the line wires and arranged to respond ringing current superimposed on a positively biased urrent.
Figure 2:
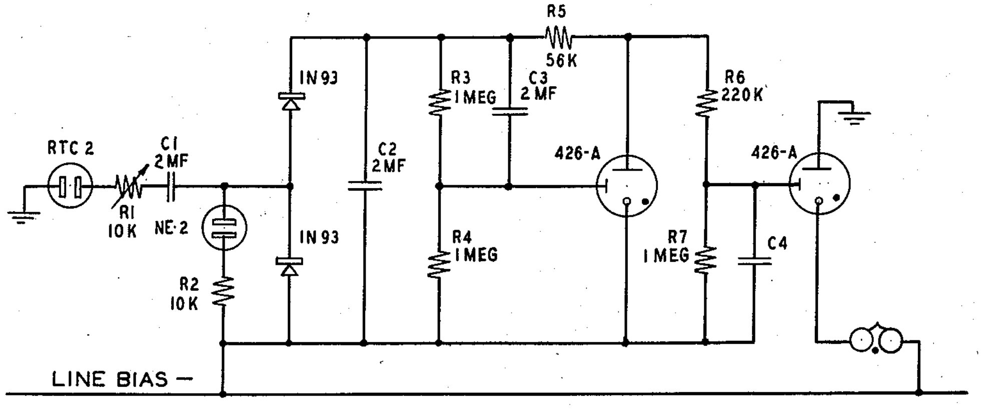
Fig. 2 is the same circuit but arranged to respond to nging current superimposed on a negatively biased cur- nt.

Looking at Fig. 1 it will be noted that to the line which may be either the tip or ring of a telephone at the substation, there is connected a two ring useful under given circumstances for connecting a ger 2 through a triggered tube V–2 to ground so that ringing current flowing over the line will operate the ger to attract the attention of the subscriber thereat. circuit of Fig. 1 is arranged to respond to ringing ent superimposed only on a positively biased current, the anode of the tube V–2 must be positively biased. he ringing current is superimposed on a negatively ed current, then the pad must be connected as wn in Fig. 2 where the anode of the tube V–2 will ositive with respect to its cathode.

fter the tube V–1 is fired and as the condensers C–2 C–3 attain their charge, the potential at the junction esistances R3 and R4 is lowered to a point consider- below the potential required for firing the tube V–1, this tube having been fired nevertheless remains in nducting state and this condition will continue as as ringing current is transmitted over line 1.

e two ring pad of Figs. 1 and 2 is constructed and ged to enable the ringer 2 only in response to a ring code and to prevent the enabling of the ringer sponse to a one long ring code. The outstanding re of the operation of this circuit is that a first er tube V–1 is immediately fired before the con- densers C–2 and C–3 can have been charged and by the conduction of current from its main anode to its cathode will depress the potential at the junction of resistances R–5 and R–6 and likewise depress the potential at the junction of the resistances R–6 and R–7 below the firing potential of the tube V–3. As long as the ringing current is supplied to this circuit, then, the tube V–3 will be prevented from firing and thus the circuit will not respond to a one long ring code. However, at the end of any ring which caused the firing of the tube V–1, the charge on the condensers C–2 and C–3 will begin to dissipate. If now the silent interval is short as between the two rings of a two ring code, these two condensers do not become fully discharged and the following application of ringing current will not produce a surge to provide a firing potential to the starting anode of the tube V–1 and hence this tube fails to fire and consequently the full potential of the network is applied across the voltage divider consisting of the resistances R–5, R–6 and R–7 and consequently the potential at the starting anode of the tube V–2 rises sufficiently for this tube to fire. Since the continuation of the ringing current merely drives the condensers C–2 and C–3 to full charge, the tube V–1 will not fire and the tube V–2 will remain active.

In somewhat more detail the circuit of Fig. 1 operates in this manner. The diode 3 isolates the circuit from the talking conductor 1, and the V–2 tube while inactive performs the same function during the talking period. When ringing current appears on the line 1, this being of higher potential, it passes through the diode 3, the R–1 resistance and the condenser C–1. The variable resistance R–1 is used to compensate for the effect of line loss and is not reset after its initial adjustment on a particular installation. The two condensers C–1 and C–2 and the two rectifier diodes 4 and 5 constitute a voltage doubling direct current power supply. The NE2 neon diode is used as a voltage regulator and the R2 resistance limits the peak currents through the voltage regulator.

The C–2 condenser charges up in relatively short time after the ringing current appears on the line 1. The C–3 condenser couples this large and rapid voltage change to the starting anode of V–1 and then as it starts charging brings the potential of the starting anode down toward the proportion of the supply voltage determined by the voltage divider circuit R–3 and R–4. As a result of the initial voltage surge on the starting anode, the starting anode to cathode gap breaks down and the tube V–1 then fires through the resistance R–5. With the main anode of the tube V–1 conducting, the potential at the junction of the resistances R–6 and R–7 is too low to trigger the tube V–2.

The above described action takes place every time that ringing current is transmitted over the line whether the bias is positive or negative. If the detector is attached for positive bias, as shown in Fig. 1, and negative bias is connected to the line, V–2 will not conduct no matter what ringing code is applied. Likewise, a detector connected for negative bias as shown in Fig. 2 cannot conduct ringing current with positive bias applied because of the characteristics of the gas relay tube V–2.

The detector of Figs. 1 and 2 is meant to allow the ringer in the subscriber's telephone set to ring when the code is a two short ring code. The operation is depicted in Fig. 5 where the two short ringing intervals are shown as covering the periods $t_1$ to $t_2$ and $t_3$ to $t_4$. The graphs in the bracket marked 2 ring pad show the potentials at the starting anodes of the tubes V–1 and V–2. The condenser C–1 charges up very shortly after time $t_1$ and since the tube V–1 immediately fires the potential on the starting anode of tube V–2 is held below the value necessary for the firing of this tube. At time $t_2$ the condenser C–2 begins to discharge through the high resistance bridge R–3 and R–4 and the condenser C–3 likewise begins to discharge through R–3. However, the time constant is such that the potential at the starting anode of the tube V–1 is held at a value below the firing point of this tube whereby when ringing current is again applied to the line at time $t_3$, V–1 is prevented from firing and there now being no load on the resistance R–5, the potential at the starting anode of V–2 rises beyond the critical value. Therefore during the interval between time $t_3$ and $t_4$ the tube V–2 will conduct ringing current through the ringer 2.

When the code is the one long ring, the action is depicted in Fig. 6. Here the tube V–1 is immediately fired and since there is a load on the resistance R–5 the potential of the starting anode of V–2 remains constantly below the critical value from time $t_2$ to time $t_4$ and the tube V–2 does not fire.

The long time constant of this circuit is shown by the slow decay of the potential of the starting anode of V–2 between times $t_2$ and $t_3$ and between times $t_4$ and the next $t_1$ in Fig. 5 and between times $t_4$ and the next $t_2$ in Fig. 6. It will be understood that these graphs have been idealized to bring out clearly the operation of the circuits of the present invention.

In both Figs. 5 and 6, certain areas have been filled in during the time that ringing current is applied to the line and during which the tube V–2 (in Figs. 1 and 2) and tube V–3 (in Figs. 3 and 4) are made to conduct. The lowermost graph in both Figs. 5 and 6, marked output, represent the application of ringing current to the ringer 2. It will be noted that the 2 ring pad (of Figs. 1 and 2) and the one long ring pad (of Figs. 3 and 4) both produce an output consisting of one short ring between times $t_3$ and $t_4$ and since these are produced at different substations on the same party line it will simulate the operation of a single party line and no subscriber will be annoyed by having to listen to codes used to summon other parties on the line.

Figure 3:
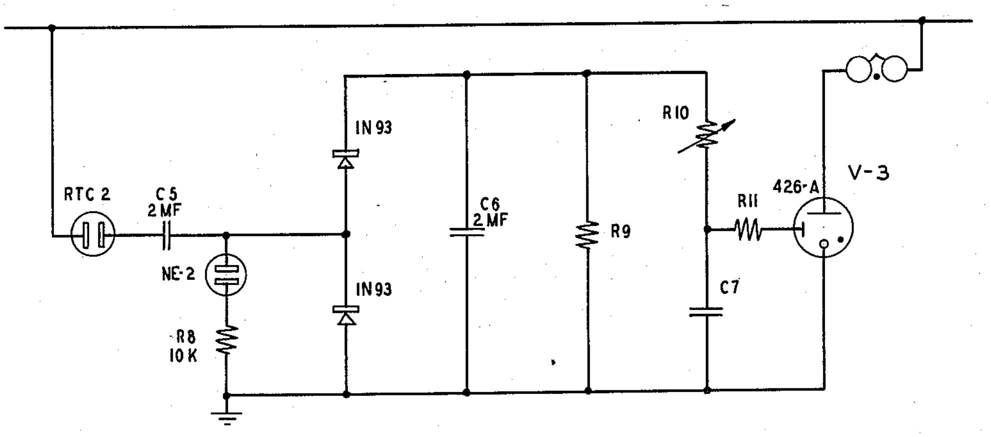
Fig. 3 is a schematic circuit diagram of a one ring d for excluding all two ring codes and for passing a nging signal triggered by a one long ring code to the bstation where it is located, the pad being shown con- cted to one of the line wires and arranged to respond ringing current superimposed on a positively biased rrent.
Figure 4:
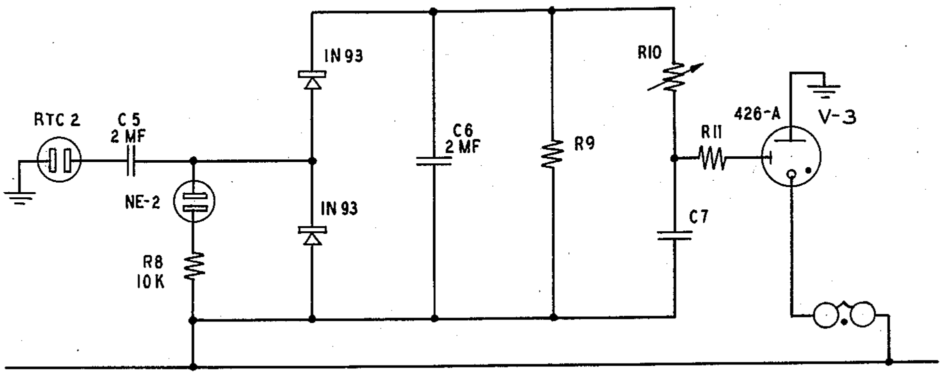
Fig. 4 is the same circuit as that of Fig. 3 arranged respond to ringing current superimposed on a nega- ely biased current.

The operation of the one ring pad of Figs. 3 and 4 is somewhat different since there is no intermediate tube to fire immediately to hold the potential of the fired tube down. The time constant of this circuit differs as shown in Figs. 5 and 6, in that the build up of the potential on the starting anode of the tube V–3 is slow and will not reach the critical value within the limits of one of the short rings. Therefore as shown in Fig. 5 in the graph marked "1 ring pad," the potential of the starting anode of V–3 rises slowly during the first ring of a two ring code and reaches a critical value just beyond the time $t_2$ and then drops quickly so that at time $t_3$ the action starts over from the beginning. Thus the 1 ring pad (of Figs. 3 and 4) will pass no ringing current on a two ring code. However, when a long ring is applied to the line as depicted in Fig. 6, the potential of the starting anode of V–3 will reach the critical value shortly after time $t_3$ so that ringing current will be applied to the ringer 2 for the remainder of the one long ring.

By this means each substation of a party line may be provided with an electronic circuit powered entirely by current transmitted over the line and will convert the coded ringing current to a different code to simulate the operation of a single party line.

The value of the various components marked on the drawings and the commercial designations used are by way of example and are used merely to give a clear understanding of the spirit of the invention.

What is claimed is:

1. In a telephone system, a subscriber line having a plurality of substations thereon and each substation having a ringer, means for selectively signaling said substations consisting of means for applying coded ringing current thereto including codes of two short rings and codes of one long ring, an electronic circuit at each said station intended to be signaled by a two short ring code, said circuit having two electronic tubes and being responsive to ringing current transmitted thereto over said subscriber line for rendering a final one of said tubes conducting in response to a second application of said ringing current thereto closely following a first application of said ringing current thereto and for preventing the enablement of said final tube in response to a single application of said ringing current thereto, said circuit including a first tube having means to block the enablement of said final tube, a triggering circuit for said first tube consisting of a voltage divider, a mid tap therefor constituting a triggering conductor and a condenser bridged about one half said voltage divider and acting when uncharged to communicate the potential applied to said voltage divider to said triggering conductor and when charged to communicate the potential of said mid tap to said triggering conductor, and a circuit for said ringer controlled by said final tube.

2. In a telephone system, a subscriber line having a plurality of substations thereon and each said substation having a ringer, means for selectively signaling said substations consisting of means for applying coded ringing current thereto including codes of two short rings and codes of one long ring, an electronic circuit at each said substation intended to be signaled by a two short ring code, said circuit having two electronic tubes and being responsive to ringing current transmitted thereto over said line for rendering a final one of said tubes conducting in response to a second application of said ringing current thereto, closely following a first application of said ringing current thereto and for preventing the enablement of said final tube in response to a single application of said ringing current thereto, said circuit including a rectifying means for deriving a direct current from said ringing current, a voltage divider circuit having a high potential portion and a low potential portion connected to said direct current source, a mid tap from said voltage divider, a condenser bridged across the high potential portion of said voltage divider circuit, a first tube for controlling said final tube and a triggering circuit for said first tube controlled by said mid tap connection, and a circuit for said ringer controlled by said final tube.

References Cited in the file of this patent

UNITED STATES PATENTS

| | | |
|---|---|---|
| 2,411,525 | Deakin | Nov. 26, 1946 |
| 2,490,054 | Hatton | Dec. 6, 1949 |
| 2,753,403 | Caracciolo | July 3, 1956 |
| 2,788,394 | Barrow et al. | Apr. 9, 1957 |
| 2,790,851 | Berch | Apr. 30, 1957 |
| 2,798,950 | Edrich | July 9, 1957 |
| 2,800,584 | Blake | July 23, 1957 |